P. I. WOLD.
THERMIONIC AMPLIFYING CIRCUIT.
APPLICATION FILED SEPT. 2, 1916.

1,232,879.

Patented July 10, 1917.

Inventor:
Peter Irving Wold.
by J. E. Roberts Att'y.

UNITED STATES PATENT OFFICE.

PETER IRVING WOLD, OF EAST ORANGE, NEW JERSEY, ASSIGNOR TO WESTERN ELECTRIC COMPANY, INCORPORATED, OF NEW YORK, N. Y., A CORPORATION OF NEW YORK.

THERMIONIC AMPLIFYING-CIRCUIT.

1,232,879.      Specification of Letters Patent.      Patented July 10, 1917.

Application filed September 2, 1916. Serial No. 118,303.

*To all whom it may concern:*

Be it known that I, PETER IRVING WOLD, a citizen of the United States, residing at East Orange, in the county of Essex and State of New Jersey, have invented certain new and useful Improvements in Thermionic Amplifying-Circuits, of which the following is a full, clear, concise, and exact description.

This invention relates to the amplification of small direct voltages or currents, and its purpose is to make it possible to detect or measure such voltages or currents which could not otherwise be detected or measured by the instruments at hand.

This object is accomplished by the use of amplifiers in connection with a suitable form of indicator, such as a galvanometer, the circuit arrangements being such as to give a new and useful result.

If in the measurement of minute voltages or currents it is found that the galvanometer or other measuring or detecting instrument is not of sufficient sensitivity, it seems an obvious thing to attempt some method of amplification of the quantity to be measured. Until recent times, however, this has not been possible with any degree of satisfaction, because the existing amplifiers produced too much distortion or were so unstable that they could not be relied upon to repeat themselves.

The thermionic vacuum tube, commonly known as the audion, has, when properly constructed, supplied a distortionless amplifier and is well adapted for the amplification of alternating current voltage when said voltage is impressed directly or indirectly upon the input circuit of such an amplifier, and the output circuit contains an instrument receptive to the alternating current component of the output circuit. Such an arrangement will not work satisfactorily for direct current voltages, however, for there would be a continuous and relatively large direct current flowing through the galvanometer placed in the output circuit of the amplifier, and the quantity to be measured would have to be expressed in terms of the variation in the galvanometer deflection. Under such conditions, the sensitivity of the galvanometer will be very much reduced, and the galvanometer will, furthermore, be subject to fluctuations in the output battery.

Figure 1:
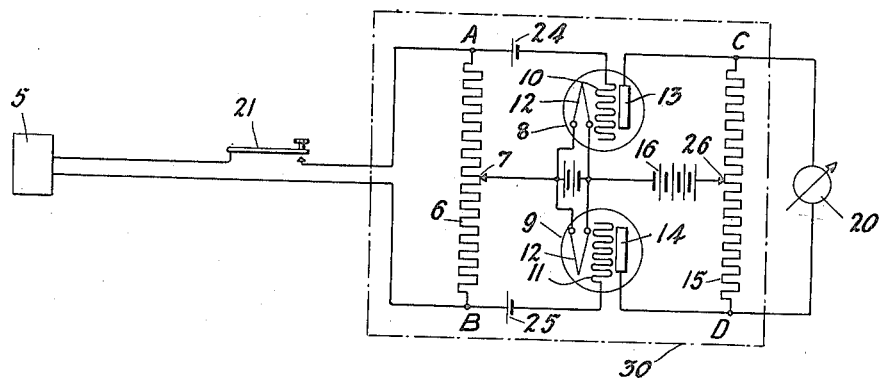
Figure 2:
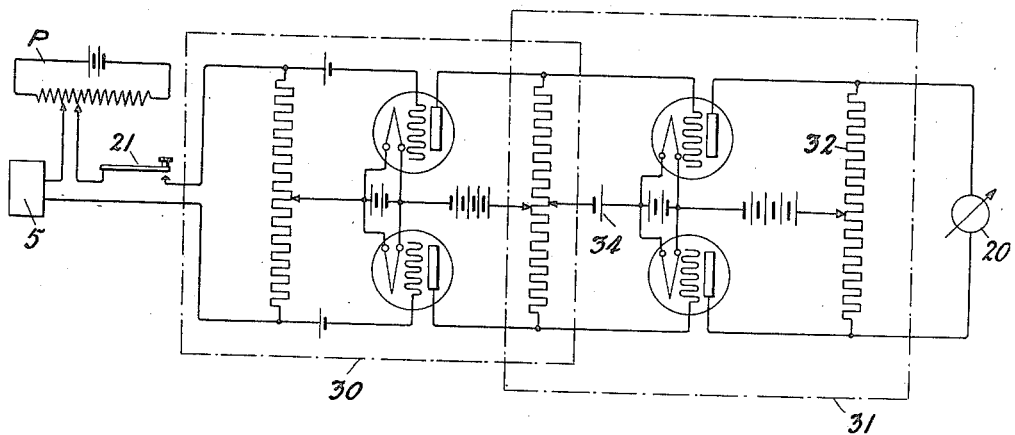

In this invention, a new circuit arrangement has been devised which overcomes the defects noted above, and this circuit arrangement will be better understood by reference to the following specification and accompanying drawing, in which Figure 1 shows one circuit for accomplishing the result, and Fig. 2 shows a modification by which it is possible to obtain further amplification than in the circuit of Fig. 1.

Referring now to Fig. 1, an arrangement of circuits somewhat similar to that shown in the so-called push-pull circuit of Colpitts Patent No. 1,128,292 of February 16, 1915, is shown. In said figure, 5 represents a source of voltage to be measured, and which is adapted to be connected in the manner hereafter described to two thermionic amplifier tubes 8 and 9 of the audion type, each amplifier tube having the usual filament, grid and plate, the filament and grid constituting the input circuit and the filament and plate constituting the output circuit. The source 5 is connected to the terminals of the non-inductive resistance 6, and to one terminal of this resistance is connected the grid 10 of the tube 8. The other terminal of said resistance 6 is connected to the grid 11 of the second tube 9 which is as nearly identical to the tube 8 as possible. The middle point of the resistance 6 is connected to the filaments 12 of both amplifiers by the conductor 7 as shown.

A non-inductive resistance 15 has its terminals connected to the plates of the amplifiers 8 and 9, respectively, the middle point of said resistance being connected to the filaments of the amplifier through the power battery 16. It will thus be seen that there are two input circuits consisting, respectively, of the circuits 12, 7, 6, 10 and 12, 7, 6, 11 and that there are similarly two output circuits consisting of the circuits 12, 16, 26, 15, 13 and 12, 16, 26, 15, 14, in which the battery 16 is common to the two output circuits. Across the terminals of the resistance 15 is then connected a direct current galvanometer 20 of any suitable form. A key 21 is placed in series with the source of voltage 5, and batteries 24 and 25 are inserted, if desired, in the input circuit.

It will be observed that current from the battery 16 divides at the middle point of the resistance 15 and flows through the two output circuits. In view of the fact that the thermionic tubes were selected as nearly identical as possible, it will be apparent that the current flowing through the two halves of resistance 15 will be equal and opposite, and that, therefore, the points C, D will normally be at the same potential, and no current therefore flows through the galvanometer. Upon the closing of the key 21, however, a current will flow through the resistance 6, and if the direction is such as to bring the terminal A to a higher potential than the terminal B, the grid 10 will have a higher potential than the grid 11. As a result, the impedance through the tube 8 will be decreased, while the impedance through the tube 9 will be increased, and the current flowing through the output circuit of the amplifier 8 will be greater than that flowing through the output circuit of the amplifier 9. As a result, the point C will be at a lower potential than the point D and current will flow through the galvanometer 20. In case the current flow through the resistance 6 is in the reverse direction, it will be apparent that the current through the galvanometer 20 will also be reversed. By the arrangement thus described, it is possible to obtain a strong amplified effect in the galvanometer and to keep from said galvanometer the normal direct current component of the output circuit.

The batteries 24 and 25 are inserted in the input circuits for the purpose of bringing the grids to a potential lower than that of the filaments, this being for the now well-understood purpose of preventing the flow of current from the grid to the filament. It will be desirable to make at least one of these batteries adjustable by means of a potentiometer or otherwise, in order to correct for slight dissimilarities in the two audions used. If desired, one such battery alone may be used, this battery being put in that portion 7 of the circuit between the filament and the midpoint of the resistance 6 so as to be common to both input circuits. In such a case, it will also be desirable to make the point of contact 26 with the resistance 15 adjustable over a small range, thereby making it possible to allow for slight differences in the normal impedances of the amplifiers.

One of the marked advantages of this circuit arrangement is that the galvanometer 20 is independent of the fluctuations in the battery 16, for any such fluctuation will affect the current flowing in the two output circuits in the same manner, thus leaving the points C and D still normally at the same potential.

In general it is immaterial whether the resistances 6 and 15 are inductive or non-inductive, but for measurements of high accuracy with sensitive galvanometers non-inductive resistances are preferable in order to avoid the disturbing effects of induced electro-motive forces when the key 21 is opened and closed.

Fig. 2 shows an extension of the circuit of Fig. 1 and in this figure the portion of the circuit within the area 30 is the same as that described and shown in the area 30 of Fig. 1. Instead, however, of having a galvanometer directly connected across the terminals of the resistance 15, these terminals are connected to the grids of two amplifiers which are arranged in a circuit shown within the area 31, this circuit being identical to that shown within the area 30. Across the terminals of the resistance 32 is then connected the galvanometer 20 in the manner indicated for Fig. 1. It will be noticed that in the circuit 31, the two batteries 24 and 25 have been replaced by a single grid battery 34 placed in that portion of the circuit which is common to both of the input circuits as mentioned above.

The operation of this circuit is the same as that for Fig. 1 except for the fact that there is a double amplification and it is apparent that the circuit is adapted for the addition of further steps of amplification.

In this Fig. 2, it is also shown how this circuit may be used for the null-method of measuring voltages, this consisting of the insertion in series with the source 5 of a potentiometer system P, and in this case, a measurement of the determined voltage of the source 5 is made by so adjusting the potentiometer that no deflection is obtained in the galvanometer 20 upon the closing or opening of the key 21.

While this circuit has been shown with a simple form of direct current galvanometer connected across the terminals of the output resistance, it is apparent that the two halves of the output resistance 15 of Fig. 1 or 32 of Fig. 2 may constitute the two coils of a differential galvanometer, the two coils being so connected that no deflection results from the flow of normal space current, but that a deflection is produced when the current through the one is increased with the simultaneous decrease of the current in the other, resulting from the impression of the voltage from 5 upon the input circuits.

While the specification thus far has spoken of the measurement of voltages, it is to be understood that it may be used for the amplification and measurement of small currents as well, this being accomplished by permitting the current to flow through a known resistance and by impressing the voltage over this resistance upon the grids of the circuits in the same manner as has been described for the measurement of voltages.

What is claimed is:

1. A circuit for measuring direct current voltages comprising a plurality of amplifiers, a source of direct current voltage to be measured, connections for applying said voltage on the input circuits of the amplifiers at will, a direct current indicating instrument so associated with the output circuits of the amplifiers that no deflection is produced by the normal currents through said amplifiers.

2. A circuit for measuring direct current voltages comprising two thermionic amplifiers of the audion type, a source of direct current voltage to be measured, means for connecting said direct current voltage to the respective grids of said amplifiers, a galvanometer so connected as to be acted upon differentially by the space current of said amplifiers whereby no deflection of the galvanometer results from the normal output currents of said amplifiers.

3. A circuit for measuring direct current voltages comprising two thermionic amplifiers of the audion type the filaments of said amplifiers being connected together, a source of direct current voltage to be measured, means for connecting said direct current voltage to the respective grids of said amplifiers in opposition, a galvanometer so connected as to be acted upon differentially by the space current in said amplifiers whereby no deflection of the galvanometer results from the normal output current of said amplifiers.

4. A circuit for measuring direct current voltages comprising two thermionic amplifiers of the audion type the filaments of said amplifiers being connected together, a source of direct current voltage to be measured, means for connecting said direct current voltage to the respective grids of said amplifiers in opposition, a power battery in common to the output circuits of said amplifiers, a galvanometer so connected as to be acted upon differentially by the two output circuits whereby no deflection of the galvanometer results from the normal output currents of said amplifiers.

5. A circuit for measuring direct current voltages comprising two thermionic tubes of the audion type, a power battery, a resistance with its mid-point connected through the power battery to the filaments of said amplifiers, connections from the ends of said resistance to the plates of said amplifiers respectively, a galvanometer connected across the terminals of said resistance, means for connecting the direct current voltage to be measured to the grids of the amplifiers.

6. A circuit for measuring direct current voltages comprising two thermionic amplifiers of the audion type, a resistance, a connection from the mid-point of said resistance to the filaments of said amplifiers, connections from the ends of said resistance to the grids of said amplifiers respectively, a power battery, a second resistance with its mid-point connected through the power battery to the filaments, connections from the terminals of said second resistance to the plates of said amplifiers respectively, a galvanometer connected across the terminals of said second resistance, means for connecting the direct current voltage to be measured to the terminals of said first resistance at will.

7. A circuit for measuring direct current voltages comprising two thermionic amplifiers of the audion type, a non-inductive resistance, a connection from the middle point of said resistance to the filaments of said amplifiers, connections from the ends of said resistance to the grids of said amplifiers respectively, a battery for controlling the potential of the grids with respect to the filaments, a power battery, a second non-inductive resistance with its mid-point connected through the power battery to the filaments, connections from the terminals of said second resistance to the plates of said amplifiers respectively, a galvanometer connected across the terminals of said second resistance, means for connecting the direct current voltage to be measured across the terminals of said first resistance at will.

In witness whereof, I hereunto subscribe my name this 1st day of September A. D., 1916.

PETER IRVING WOLD.